United States Patent
Hur et al.

(10) Patent No.: US 10,476,146 B2
(45) Date of Patent: Nov. 12, 2019

(54) ANTENNA DEVICE, MANUFACTURING METHOD THEREFOR, AND ELECTRONIC DEVICE HAVING ANTENNA DEVICE

(71) Applicant: AMOSENSE CO., LTD., Cheonan-si (KR)

(72) Inventors: Tae Hyun Hur, Asan-si (KR); Jae Yeong Lee, Seoul (KR); Jong Soo Kim, Yongin-si (KR)

(73) Assignee: AMOSENSE CO., LTD., Cheonan-si (KR)

( * ) Notice: Subject to any disclaimer, the term of this patent is extended or adjusted under 35 U.S.C. 154(b) by 243 days.

(21) Appl. No.: 15/538,413

(22) PCT Filed: Jan. 11, 2016

(86) PCT No.: PCT/KR2016/000223
§ 371 (c)(1),
(2) Date: Jun. 21, 2017

(87) PCT Pub. No.: WO2016/117867
PCT Pub. Date: Jul. 28, 2016

(65) Prior Publication Data
US 2018/0006366 A1 Jan. 4, 2018

(30) Foreign Application Priority Data
Jan. 19, 2015 (KR) .................. 10-2015-0008773

(51) Int. Cl.
*H01Q 1/38* (2006.01)
*H01Q 1/24* (2006.01)
(Continued)

(52) U.S. Cl.
CPC ............... *H01Q 1/38* (2013.01); *H01Q 1/24* (2013.01); *H02J 7/025* (2013.01); *H02J 50/12* (2016.02); *H01Q 11/08* (2013.01)

(58) Field of Classification Search
CPC ........... H02J 50/12; H02J 7/025; H02J 50/23; H01Q 1/38; H01Q 1/24; H01Q 7/00; H01Q 11/08
See application file for complete search history.

(56) References Cited

U.S. PATENT DOCUMENTS

2007/0236398 A1* 10/2007 Nam .................. H01Q 1/243
343/702
2012/0274148 A1* 11/2012 Sung .................. H04B 5/0037
307/104
(Continued)

FOREIGN PATENT DOCUMENTS

KR 20060057106 5/2006
KR 20070099195 10/2007
(Continued)

OTHER PUBLICATIONS

International Search Report—PCT/KR2016/000223 dated Apr. 19, 2016.

*Primary Examiner* — Dameon E Levi
*Assistant Examiner* — David E Lotter
(74) *Attorney, Agent, or Firm* — Cantor Colburn LLP

(57) ABSTRACT

Provided are an antenna device, a method of manufacturing the same, and an electronic apparatus having the antenna device. The antenna device includes: an insulating substrate; a first antenna pattern formed on one surface of the insulating substrate; and a second antenna pattern formed on the other surface of the insulating substrate and connected to the first antenna pattern.

7 Claims, 4 Drawing Sheets

(51) Int. Cl.
*H02J 50/12* (2016.01)
*H02J 7/02* (2016.01)
*H01Q 11/08* (2006.01)

(56) References Cited

U.S. PATENT DOCUMENTS

2013/0249302 A1* 9/2013 An .......................... H01F 41/14
307/104
2015/0380355 A1* 12/2015 Rogers .................. H01L 23/538
257/773

FOREIGN PATENT DOCUMENTS

| KR | 20080046811 | 5/2008 |
| KR | 101179398 | 9/2012 |
| KR | 20130083763 | 7/2013 |
| KR | 101317897 | 10/2013 |

* cited by examiner

ANTENNA DEVICE, MANUFACTURING METHOD THEREFOR, AND ELECTRONIC DEVICE HAVING ANTENNA DEVICE

TECHNICAL FIELD

The present invention relates to an antenna device, and more particularly, to an antenna device in which an antenna pattern is formed of an electrically conductive thin film on both sides of an insulating substrate to improve productivity by reducing etching time, and to improve charging efficiency by reducing resistance of a wireless power signal, a method of manufacturing the same, and an electronic apparatus having the antenna device.

BACKGROUND ART

With the recent development of wireless communication technology, antenna devices are embedded in various electronic apparatuses and their use is increasing rapidly.

The electronic apparatus having the built-in antenna device performs various additional functions by communicating with other electronic apparatuses using other built-in antenna devices.

For example, data transmission is performed between antenna devices built in a smart device, and data transmission/reception is performed using short-range communications or Wi-Fi communications between smart terminals, for example.

In recent years, more advanced forms of antenna devices have been used to transmit and receive power wirelessly. In other words, although a technique of receiving power using a power line has been mainly used in the past, development of a wireless power transfer (WPT) technology capable of receiving power by radio has been actively developed.

Such a wireless power transmission technology is a technology of enabling an antenna device built in an electronic apparatus to receive wireless power in the form of electromagnetic induction or electromagnetic resonance and to supply power anytime and anywhere wirelessly without a power line such as an electric wire or cable.

Korean Patent Application Publication No. 10-2007-0099195 discloses a double-sided antenna with a micro strip structure, which includes: a circuit region outside a substrate; upper and lower dielectric regions in which metal is removed from upper and lower sides of the substrate; and upper and lower antenna patterns respectively formed in the upper and lower dielectric regions.

Korean Patent Application Publication No. 10-2007-0099195 has an advantage that one of the upper and lower antennas respectively formed on both sides of the substrate has a relatively good propagation environment, and the antenna having the relatively good propagation environment may be selectively used. However, there is a disadvantage that the double-sided antenna cannot be realized with one antenna because the upper and lower antennas are not connected with each other, and a switch for selectively switching the upper and lower antennas is separately provided and thus the double-sided antenna is therefore unsuitable as a recent antenna device for wireless charging.

DISCLOSURE

Technical Problem

An object of the present invention is to provide an antenna device capable of shortening an etching time and thus improving productivity by forming antenna patterns by simultaneously wet-etching a conductive thin film on both surfaces of an insulating substrate, a method of manufacturing the same, and an electronic apparatus having the antenna device It is another object of the present invention to provide an antenna device capable of improving charging efficiency by reducing resistance of a wireless power signal by forming antenna patterns on both sides of an insulating substrate, a method of manufacturing the same, and an electronic apparatus having the antenna device.

Technical Solution

In order to achieve the above-mentioned object, according to an aspect of the present invention, there is provided an antenna device comprising: an insulating substrate; a first antenna pattern formed on one surface of the insulating substrate; and a second antenna pattern formed on the other surface of the insulating substrate and connected to the first antenna pattern.

In the antenna device according to an embodiment of the present invention, each of the first and second antenna patterns may be formed of a conductive thin film patterned in a helical pattern from a start end to a terminus end, in which the start ends of the first and second antenna patterns may be connected with each other. Here, the start ends of the first and second antenna patterns may be formed by one of ultrasonic welding, spot welding, or conductive via holes.

The insulating substrate may be a rigid substrate or a flexible substrate. The insulating substrate may be made of any one material selected from among polyethylene terephthalate (PET), polyimide (PI), polyethylene naphthalate (PEN), polyvinyl chloride (PVC), acrylic resin, heat-resistant epoxy, ethylene vinyl acetate (EVA), butyl rubber resin, polyarylate, silicone, ferrite, ceramic and FR-4 which is a grade designation assigned to glass-reinforced epoxy laminate sheets, tubes, rods and printed circuit boards (PCBs).

In addition, the conductive thin film may include one selected from the group consisting of Fe, Cu, Ni, Zn, Sn, Au, Ag, Pt, Rh (rhodium), and Pd (palladium), and an alloy of at least two selected from the group consisting of Fe, Cu, Ni, Zn, Sn, Au, Ag, Pt, Rh, and Pd, in which the conductive thin film may be in the form of a slim film.

The antenna device according to the embodiment of the present invention may be used to perform an antenna function of transmitting and receiving power wirelessly. In this case, the first and second antenna patterns may play a role of an antenna for wirelessly transmitting and receiving power by a magnetic resonance method or a magnetic induction method. The thicknesses of the first and second antenna patterns may be the same.

According to another aspect of the present invention, there is provided a method of manufacturing an antenna device, the method comprising: forming respective conductive thin films on both surfaces of an insulating substrate; forming a mask pattern on the conductive thin film formed on either side of the insulating substrate; forming first and second antenna patterns by simultaneously wet-etching the conductive thin films formed on both the surfaces of the insulating substrate, by masking the conductive thin films with the mask patterns; removing the mask patterns; and connecting the first and second antenna patterns with a conductive member.

In the method of manufacturing an antenna device according to an embodiment of the present invention, the connecting the first and second antenna patterns with the conductive member may include connecting start ends located inside the first and second antenna patterns, with the conductive member.

Advantageous Effects

As described above, according to the present invention, a mask pattern is formed on each of the conductive thin films on both surfaces of the insulating substrate, and the conductive thin films on which the mask patterns are formed are simultaneously wet-etched, to thus form the first and second antenna patterns. Accordingly, it is possible to increase the etching rate much faster than the etching rate for forming the antenna pattern formed to be relatively thick on the single surface of the insulating substrate, thereby improving the productivity.

According to the present invention, the antenna patterns are respectively implemented on both sides of the insulating substrate to reduce the resistance of the wireless power signal, thereby improving the charging efficiency.

According to the present invention, since the terminus ends of the first and second antenna patterns formed on both surfaces of the insulating substrate perform terminal functions, a separate pattern for leading out the terminals is not required, so that the manufacturing cost can be reduced.

In addition, since the thickness of the antenna pattern according to the present invention is thinner than that of the conventional antenna pattern formed on one surface of the insulating substrate, the width of the antenna pattern to be etched to the side of the antenna pattern is much smaller in the etching process for patterning, to thereby perform actual dimension etching.

BEST MODE

Hereinafter, embodiments of the present invention will be described in detail with reference to the accompanying drawings.

Figure 1:
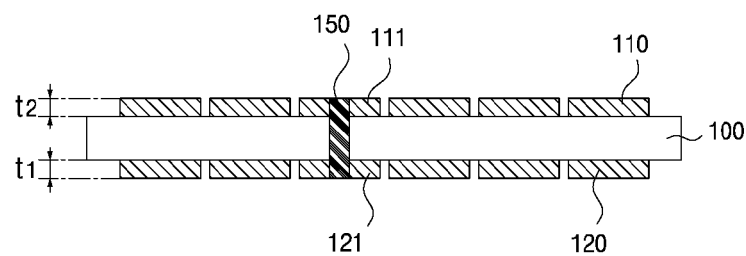
FIG. 1 is a schematic cross-sectional view of an antenna device according to the present invention.

Referring to FIG. 1, an antenna device according to the present invention includes an insulating substrate 100; a first antenna pattern 110 formed on one surface of the insulating substrate 100; and a second antenna pattern 120 formed on the other surface of the insulating substrate 100 and connected to the first antenna pattern 110.

A preferred structure of the antenna device according to the present invention is characterized in that each of the first and second antenna patterns 110 and 120 is made of a conductive thin film patterned in a helical pattern from a start end to a terminus end and is implemented as a structure in which the start ends of the first and second antenna patterns 110 and 120 are connected.

In addition, the antenna device can be used to transmit or receive a wireless power signal. In this case, the first and second antenna patterns 110 and 120 may play a role of an antenna for transmitting or receiving power wirelessly using a magnetic resonance method or a magnetic induction method.

The insulating substrate 100 may be a rigid substrate or a flexible substrate. The insulating substrate may be made of any one material selected from among polyethylene terephthalate (PET), polyimide (PI), polyethylene naphthalate (PEN), polyvinyl chloride (PVC), acrylic resin, heat-resistant epoxy, ethylene vinyl acetate (EVA), butyl rubber resin, polyarylate, silicone, ferrite, ceramic and FR-4 which is a grade designation assigned to glass-reinforced epoxy laminate sheets, tubes, rods and printed circuit boards (PCBs).

The conductive thin film constituting the first and second antenna patterns 110 and 120 may be formed of one selected from the group consisting of iron (Fe), copper (Cu), nickel (Ni), zinc (Zn), tin (Sn), gold (Au), Platinum (Pt), Rh (rhodium), and Pd (palladium), and an alloy of at least two selected from the group consisting of Fe, Cu, Ni, Zn, Sn, Au, Ag, Pt, Rh, and Pd. In this case, the conductive thin film may be in the form of a slim film.

In addition, the conductive thin film constituting the first and second antenna patterns 110 and 120 may be formed of a coated thin film containing a conductive material. Here, the coating slurry in which the conductive material is dispersed in the form of powder is coated on an insulating substrate 100, and then the coated thin film is spirally patterned to form an antenna pattern.

Figure 2A:
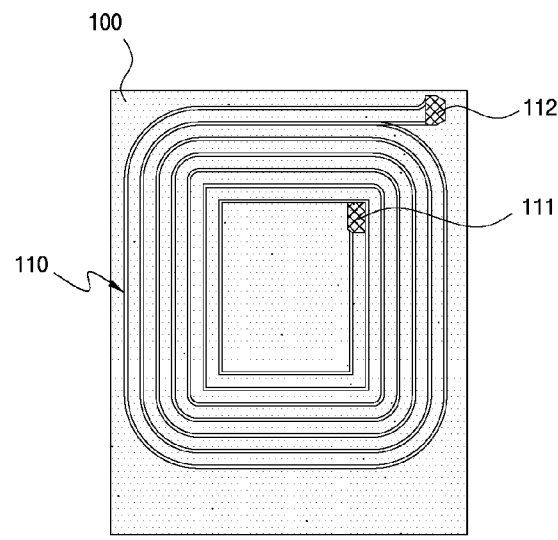
FIGS. 2A and 2B are schematic plan views of an antenna device according to the present invention.
Figure 2B:
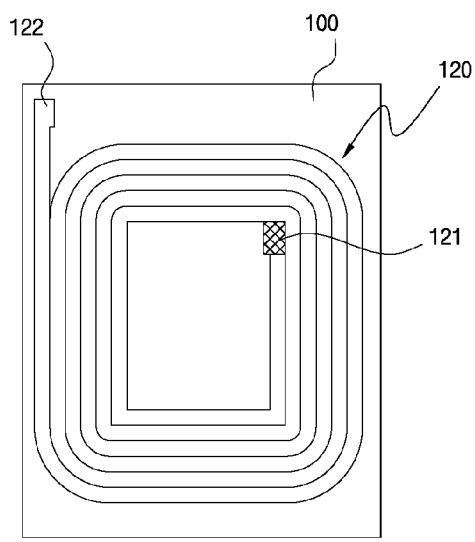

Referring to FIGS. 2A and 2B, the first antenna pattern 110 represents a coiled antenna shape, in which an antenna conductor is wound helically from a first start end 111 to a first terminus end 112, and is patterned in a pattern shape, and the second antenna pattern 120 represents a coiled antenna shape, in which an antenna conductor is wound helically from a second start end 121 to a second terminus end 122, and is patterned in a pattern shape, as if antenna conductors extending from the first start end 111 to the first terminus end 112, and extending from the second start end 121 to the second terminus end 122 are wound helically several times, to represent a coiled antenna shape, respectively.

Since the first start end 111 of the first antenna pattern 110 and the second start end 121 of the second antenna pattern 120 are respectively located inside the spiral patterns, the first start end 111 of the first antenna pattern 110 and the second start end 121 of the second antenna pattern 120 are connected with each other via a conductive member (150 in FIG. 1) formed through the insulating substrate 100. Accordingly, the first and second antenna patterns 110 and 120 may be formed as one antenna pattern.

Here, the first start end 111 of the first antenna pattern 110 and the second start end 121 of the second antenna pattern 120 may be connected with the conductive member 150 that is formed of one of ultrasonic welding, spot welding, and conductive via holes.

That is, the first terminus end 112 of the first antenna pattern 110 and the second terminus end 122 of the second antenna pattern 120 are arranged so as to protrude from the helical pattern without maintaining a helical shape, to accordingly perform a terminal function serving as a terminal for inputting and outputting a wireless signal to the first and second antenna patterns 110 and 120, respectively.

Therefore, in some embodiments of the present invention, since the terminus ends of the first and second antenna patterns 110 and 120 formed on both surfaces of the insulating substrate 100 function as terminals, separate patterns for leading out the terminals are not required, to thus simplify the manufacturing process and reduce the manufacturing cost.

As described above, the antenna device according to the embodiment of the present invention implemented by forming the antenna patterns on both surfaces of the insulating substrate has various advantages over an antenna device according to a comparative example in which the antenna pattern is formed on the single surface of the insulating substrate.

Figure 3:
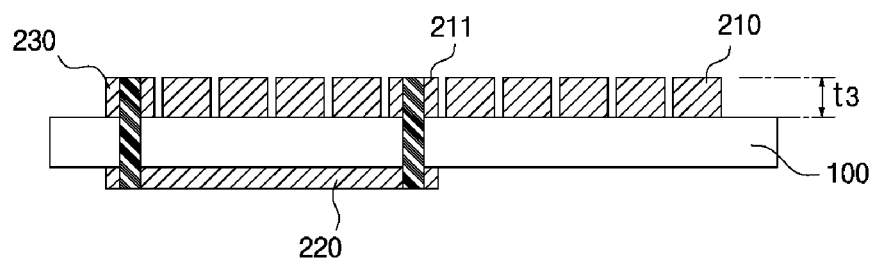
FIG. 3 is a schematic cross-sectional view showing a comparative example of an antenna device according to the present invention.
Figure 4:
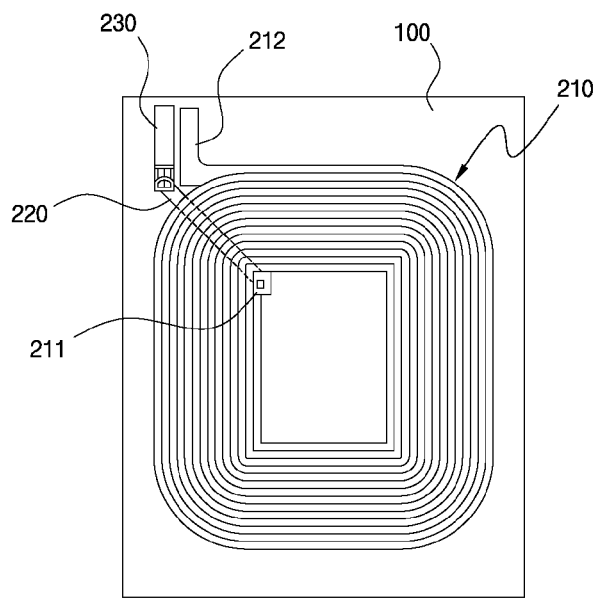
FIG. 4 is a plan view of the antenna device of the comparative example of FIG. 3.

In other words, referring to FIGS. 3 and 4, the antenna device according to the comparative example for comparison with the antenna device according to the embodiment of the present invention includes: an insulating substrate 100; an antenna pattern 210 formed on one surface of the insulating substrate 100 and composed of a conductive thin film spirally patterned from a start end 211 to a terminus end 212; a lead-out pattern 220 formed on the other surface of the insulating substrate 100 and connected to the start end 211 located inside the antenna pattern 210; and a terminal pattern 230 connected to the lead-out pattern 220 and formed on one surface of the insulating substrate 100.

In the antenna device according to this comparative example, since the antenna pattern is formed only on one surface of the insulating substrate 100, it is difficult to connect the external lead-out terminal to the start end located inside the antenna pattern.

Therefore, in the antenna device according to the comparative example, the lead-out pattern 220 is formed on the other surface of the insulating substrate 100 and the terminal pattern 230 is formed on one surface of the insulating substrate 100, in order to connect the external lead-out terminal to the start end located inside the antenna pattern. Then, a plurality of processes such as a process of connecting the start end 211 of the antenna pattern and the lead-out pattern 220 with a conductive member, and a process of connecting the lead-out pattern 220 and the terminal pattern 230 with a conductive member are performed, to thereby cause the manufacturing cost to be increased by the complicated manufacturing process and the accompanying additional material. Here, the terminus end 212 of the antenna pattern becomes a terminal pattern.

Meanwhile, in some embodiments of the present invention, a complicated terminal forming process as in the comparative example is not required by performing a single process of forming antenna patterns on both surfaces of the insulating substrate 100 and connecting the antenna patterns to both surfaces of the insulating substrate 100, to thereby reduce the manufacturing cost.

In addition, in the case of the antenna device according to the comparative example, the antenna pattern is formed in a limited space on one side of the insulating substrate 100, the line width of the antenna pattern is narrowed and the thickness t3 of the antenna pattern is large. However, in the case of the antenna device according to the embodiment of the present invention, since the first and second antenna patterns can be formed on both sides of the insulating substrate 100 to broaden the line widths of the antenna patterns and reduce the thicknesses (t1 and t2 in FIG. 1) of the first and second antenna patterns. Therefore, the resistance to the wireless power signal is reduced and the charging efficiency is improved. Here, the thicknesses t1 and t2 of the first and second antenna patterns of the antenna device according to the embodiment of the present invention are the same.

For example, although the antenna device according to the comparative example is implemented by forming an antenna pattern spirally wound twelve times on one surface of the insulating substrate 100, the antenna device according to the embodiment of the present invention is implemented by forming an antenna pattern spirally wound six times on either surface of the insulating substrate 100, that is, by dividing the antenna pattern spirally wound twelve times on one surface of the insulating substrate 100 into the antenna pattern spirally wound six times on either surface of the insulating substrate 100.

Therefore, the antenna device according to the embodiment of the present invention is configured by forming antenna patterns on both surfaces of the insulating substrate, thereby reducing the thickness of the antenna pattern and thus reducing the resistance of the wireless power signal, to thereby improve the charging efficiency.

In addition, since the thickness of the antenna pattern according to the embodiment of the present invention is thinner than the thickness of the antenna pattern according to the comparative example, the width of the antenna pattern to be etched to the side of the antenna pattern is much smaller in the etching process for patterning, to thereby perform actual dimension etching.

Figure 5:
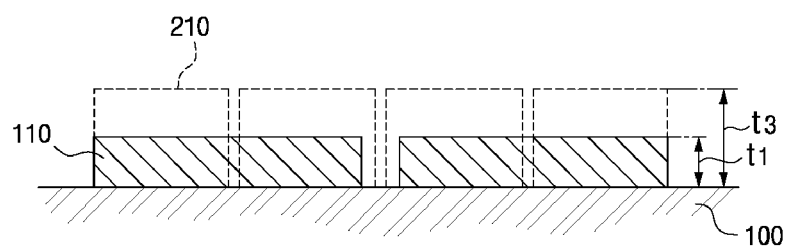
FIG. 5 is a partial cross-sectional view showing antenna patterns of the antenna device according to the present invention and the antenna device of the comparative example.

FIG. 5 is a partial cross-sectional view showing the antenna patterns of the antenna device according to the present invention and the antenna device of the comparative example.

The antenna pattern 110 of the antenna device according to the embodiment of the present invention is the same as the antenna pattern 210 of the antenna device according to the comparative example formed only on one side of the insulating substrate 100 by being disposed on both sides of the insulating substrate 100, The line width of the antenna pattern 110 of the antenna apparatus according to the embodiment of the present invention can be made larger than the line width of the antenna pattern 210 of the antenna apparatus according to the comparative example.

In addition, the thickness t1 of the antenna pattern 110 of the antenna device according to the embodiment of the present invention can be made thinner than the thickness t3 of the antenna pattern 210 of the antenna device according to the comparative example.

Figure 6:
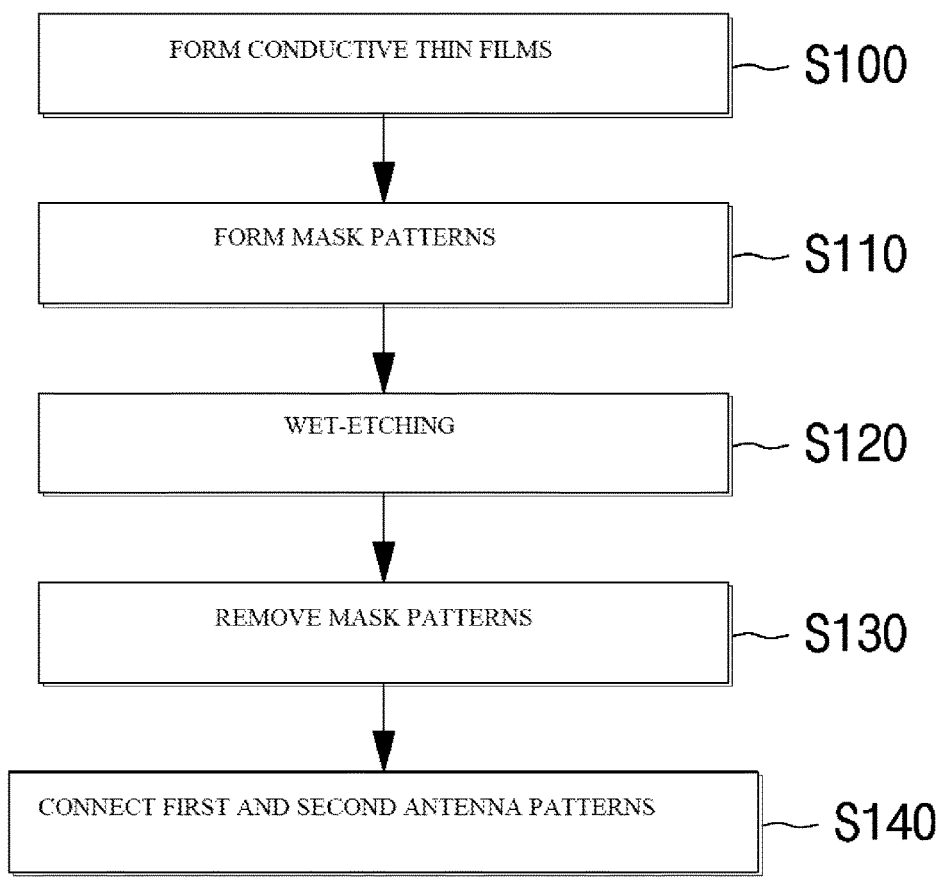
FIG. 6 is a flowchart of a method of manufacturing an antenna device according to the present invention.

FIG. 6 is a flowchart of a method of manufacturing an antenna device according to the present invention.

Referring to FIG. 6, a method of manufacturing an antenna device according to an embodiment of the present invention includes forming a conductive thin film on both surfaces of an insulating substrate, respectively (S100). Next, a mask pattern is formed on the conductive thin film formed on either surface of the insulating substrate (S110), and the conductive thin films formed on both surfaces of the insulating substrate are simultaneously wet-etched by masking with the mask pattern to form the first and second antenna patterns (S120). Thereafter, the mask patterns are removed (S130), and the first and second antenna patterns are connected with the conductive member (S140).

The mask patterns can be formed by forming a photoresist film on each of the conductive thin films, exposing the photoresist film through a photo mask, and removing the unexposed photoresist film or the exposed photoresist film by development.

The photo mask is a patterned mask for forming each of the first and second antenna patterns and the light having passed through the photo mask is irradiated to the photoresist film with the patterned light to define the first and second antenna patterns. When the photoresist film defined according to the exposure is developed in a developing solution, the mask pattern is formed.

The first and second antenna patterns are formed by forming a mask pattern on each of the conductive thin films on both surfaces of the insulating substrate and simultaneously wet-etching the conductive thin film having the mask pattern formed thereon, to thereby improve the productivity by increasing the etch rate for forming the antenna patterns according to the embodiment of the present invention, to a greater degree, in comparison with the etch rate for forming the antenna patterns according to the comparative example.

In addition, in the process of connecting the first and second antenna patterns with the conductive member, a process of connecting the start ends located inside the first and second antenna patterns with the conductive member is performed. Here, the conductive member is connected to the start end of the second antenna pattern from the start end of the first antenna pattern while passing through the insulating substrate.

The process of connecting the first and second antenna patterns with the conductive member forms with one scheme of ultrasonic welding, spot welding, and conductive via holes, and connects the first and second antenna patterns with the conductive member.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present invention is applied to an antenna device capable of improving the charging efficiency by reducing the resistance of a wireless power signal by forming antenna patterns on both sides of an insulating substrate.

What is claimed is:

1. An antenna device comprising:
an insulating substrate;
a first helical antenna pattern formed on one surface of the insulating substrate, the first helical antenna pattern being formed of a first conductive thin film and having a first start end placed inner side of the first helical antenna pattern and a first terminal end protruding from the first helical antenna pattern; and
a second helical antenna pattern formed on the other surface of the insulating substrate the second helical antenna pattern being formed of a second conductive thin film and having a second start end placed inner side of the second helical antenna pattern and a second terminal end protruding from the second helical pattern,
wherein the first start end and the second start end are connected to each other by a conductive member through a via hole formed in the insulating substrate so that the first helical antenna pattern and the second helical antenna pattern form a single antenna pattern, and the first terminal end and the second terminal end function as a terminal of the single antenna pattern to input and output a wireless power signal, and
wherein the first helical antenna pattern and the second helical antenna pattern have a same thickness.

2. The antenna device of claim 1, wherein the insulating substrate is a rigid substrate or a flexible substrate.

3. The antenna device of claim 1, wherein the insulating substrate is made of one selected from the group consisting of polyethylene terephthalate (PET), polyimide (PI), polyethylene naphthalate (PEN), polyvinyl chloride (PVC), acrylic resin, heat-resistant epoxy, ethylene vinyl acetate (EVA), butyl rubber resin, polyarylate, silicone, ferrite, ceramic, and FR-4.

4. The antenna device of claim 1, wherein the first conductive thin film and the second conductive thin film comprise one selected from the group consisting of Fe, Cu, Ni, Zn, Sn, Au, Ag, Pt, Rh (rhodium), Pd (palladium), and an alloy of at least two thereof.

5. The antenna device of claim 4, wherein the single antenna pattern forms an antenna for wirelessly transmitting and receiving power by a magnetic resonance method or a magnetic induction method.

6. An electronic apparatus incorporating the antenna device of claim 1.

7. A method of manufacturing an antenna device, the method comprising:
forming an insulating substrate;
forming a first conductive thin film on one surface of the insulating substrate;
forming a second conductive thin film on the other surface of the insulating substrate, wherein the first conductive thin film and the second conductive thin film have a same thickness;
forming a mask pattern on the first conductive thin film and the second conductive thin film;
simultaneously wet-etching the first conductive thin film and the second conductive thin film to form a first helical antenna pattern having a first start end placed inner side of the first helical antenna pattern and a first terminal end protruding from the first helical antenna pattern, and a second helical antenna pattern having a second start end placed inner side of the second helical antenna pattern and a second terminal end protruding from the second helical pattern;
removing the mask pattern; and
connecting the first start end and the second start end for the first helical antenna pattern and the second helical antenna pattern to form a single antenna pattern.

* * * * *